(No Model.)
C. F. C. STEINHAGEN.
WATER MILL.
No. 284,084. Patented Aug. 28, 1883.
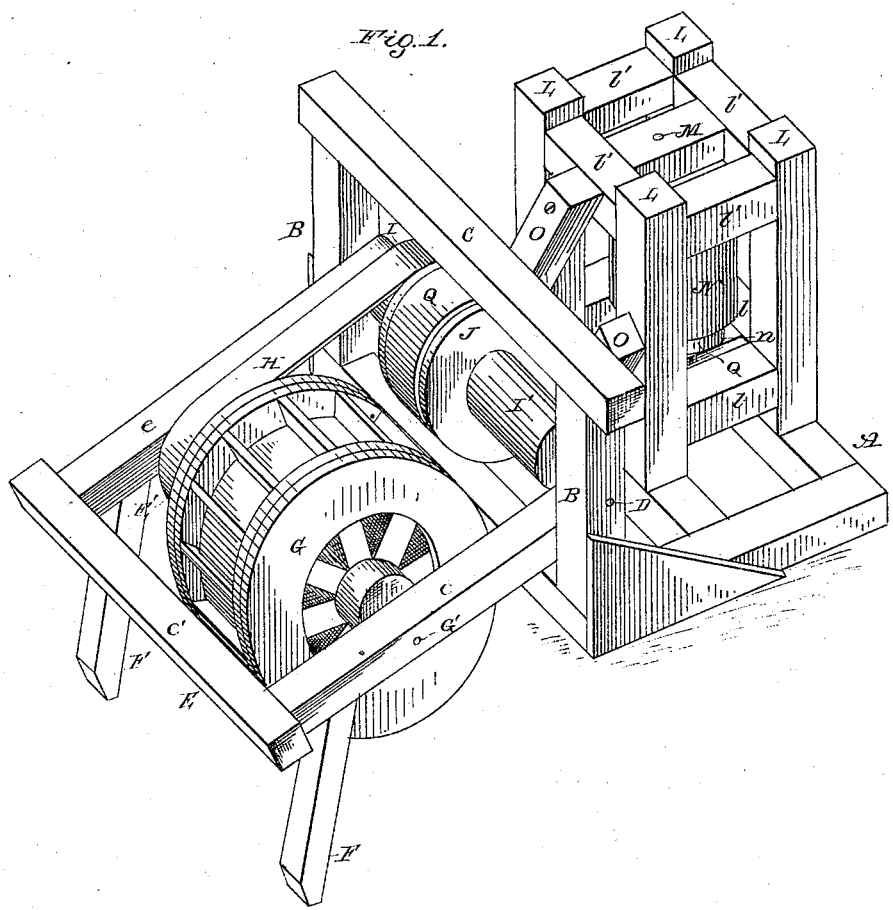
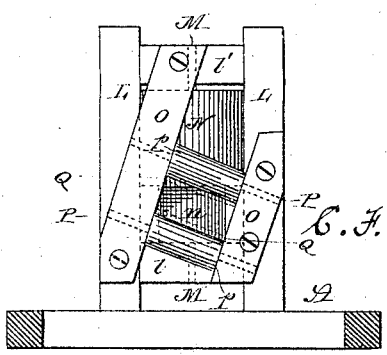
Witnesses:
J. W. Garner
G. B. Harris
Inventor:
C. F. Carl Steinhagen
per J. W. McCleary,
Atty.

UNITED STATES PATENT OFFICE.

CRISTOFER FRIDERICH CARL STEINHAGEN, OF ANDERSON, TEXAS.

WATER-MILL.

SPECIFICATION forming part of Letters Patent No. 284,084, dated August 28, 1883.

Application filed November 21, 1882. (No model.)

*To all whom it may concern:*

Be it known that I, CRISTOFER FRIDERICH CARL STEINHAGEN, of Anderson, in the county of Grimes and State of Texas, United States of America, have invented certain new and useful Improvements in Water-Mills; and I do hereby declare the following to be a full, clear, and exact description of the invention, such as will enable others skilled in the art to which it pertains to make and use the same.

My invention relates to current water-mills, the object being to provide a mill of inexpensive and durable construction, having a wheel adapted to rise and fall with the tide, and thus to maintain a constant revolution and working of the mill.

The invention consists in the combination of parts hereinafter fully described, and pointed out in the claims.

In the drawings, Figure 1 is a perspective view of my improved mill. Fig. 2 is a vertical central section of the same.

A represents a platform or base adapted to be supported upon piles or otherwise held above a stream of water, and provided with the standards B B and cross-bar C.

D represents a horizontal shaft mounted in bearings of the standards.

E represents a rectangular frame consisting of the side bars, e e, and cross-bar e', the latter connecting the ends of the former. The opposite ends of said bars e e are pivoted upon the shaft D.

F F represent inclined legs or supports for the frame E, secured to the under side of the bars e e, and adapted to hold the wheel G in position to be revolved by the current. The wheel is mounted upon a shaft, G', supported in bearings of the side bars, e e, of the pivoted frame E, and provided with a drum, E', to receive a belt, H, which passes around a drum, I, cast in the same piece with or rigidly secured to a driving-wheel, J. The latter is provided on its opposite side with a drum, I', to guide the wheel upon its shaft.

L L L L represent standards secured upon the platform A, and connected near their lower ends by horizontal cross bars or braces l, and at their upper ends by similar braces, l'.

M represents a vertical shaft supported in bearings of the central bars, l l', and carrying a band-wheel N and collar or drum n.

O O represent two inclined supports secured to the standards L, and supporting between them two parallel shafts, P P, upon which are mounted anti-friction rollers p p. A belt, Q, passes around the driving-wheel J, and is twisted to pass between the rollers p p and then around the drum n to revolve the shaft M and its band-wheel N.

It will be apparent that by the construction above described the water-wheel carried by the pivoted frame will rise and fall with the tide of the stream, and thus maintain a constant revolution and a continuous operation of the mill; also, it will be observed that my improvement affords a convenient means for connecting the vertical shaft with the machinery to be operated.

Having fully described my invention, what I claim as new, and desire to secure by Letters Patent, is—

1. The combination, with a platform adapted to be supported above a stream of water, and provided with a horizontal and a vertical shaft, of a pivoted frame and water-wheel and belt-connections, whereby said shafts are revolved, substantially as set forth.

2. The combination, with a platform and pivoted wheel-frame and wheel, of vertical standards and cross-bars supporting a vertical shaft carrying a band-wheel, inclined shafts, and friction-rollers, and a band twisted and passed between said rollers and over band-wheels to transmit motion from the water-wheel to said vertical shaft, substantially as set forth.

3. The combination, with a platform provided with two standards supporting a horizontal shaft upon which is mounted a driving-wheel, four standards, and cross-bars supporting a vertical standard and carrying a band-wheel and drum, and supports for inclined shafts carrying anti-friction rollers, of a pivoted frame having depending legs, and a horizontal shaft upon which is mounted a water-wheel and suitable belt-connections, substantially as set forth.

In testimony whereof I have signed this specification in the presence of two subscribing witnesses.

CRISTOFER FRIDERICH CARL STEINHAGEN.

Witnesses:
   J. G. McDONALD,
   NOAH BASSETT.